United States Patent
Nakamura

(10) Patent No.: US 7,350,551 B2
(45) Date of Patent: Apr. 1, 2008

(54) MOTORCYCLE TIRE WITH TREAD HAVING MAIN BLOCKS AND LOWER HEIGHT SUB BLOCKS

(75) Inventor: Ichizou Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 184 days.

(21) Appl. No.: 10/510,918

(22) PCT Filed: Apr. 15, 2003

(86) PCT No.: PCT/JP03/04790

§ 371 (c)(1),
(2), (4) Date: Oct. 12, 2004

(87) PCT Pub. No.: WO03/086784

PCT Pub. Date: Oct. 23, 2003

(65) Prior Publication Data

US 2005/0139301 A1  Jun. 30, 2005

(30) Foreign Application Priority Data

Apr. 15, 2002 (JP) ............... 2002-111677

(51) Int. Cl.
*B60C 11/11* (2006.01)
(52) U.S. Cl. ............ 152/209.11; 152/209.12; 152/209.15; 152/209.19; 152/902
(58) Field of Classification Search ........... 152/209.11, 152/209.12, 209.18, 209.19, 902, 209.15
See application file for complete search history.

(56) References Cited

U.S. PATENT DOCUMENTS

| 3,001,568 A | * | 9/1961 | Suominen | 152/209.15 |
|---|---|---|---|---|
| 5,088,535 A | * | 2/1992 | Potts et al. | 152/209.15 |
| 5,180,453 A | * | 1/1993 | Fukasawa et al. | 152/209.19 |
| 5,375,640 A | * | 12/1994 | Harms | 152/209.19 |
| 6,253,815 B1 | * | 7/2001 | Kemp et al. | 152/209.19 |
| 2003/0047266 A1 | * | 3/2003 | Yang | 152/557 |
| 2004/0123926 A1 | * | 7/2004 | Rooney | 152/209.15 |

FOREIGN PATENT DOCUMENTS

| GB | 2005200 | * | 4/1979 |
|---|---|---|---|
| JP | 57-198102 | * | 12/1982 |
| JP | A 3-143705 | | 6/1991 |
| JP | 6-320916 | * | 11/1994 |
| JP | 07-257111 | * | 10/1995 |
| JP | A 2000-25417 | | 1/2000 |
| JP | A 2001-163014 | | 6/2001 |

* cited by examiner

Primary Examiner—Steven D. Maki
(74) Attorney, Agent, or Firm—Oliff & Berridge, PLC

(57) ABSTRACT

A motorcycle tire is provided that is capable of remarkably improving a traction characteristic and an anti-sideslip characteristic for cornering without deteriorating the mud expulsion characteristic especially on a dirt road. In embodiments, a motorcycle tire has a plurality of main blocks scattered on a tread. Sub blocks are provided between the main blocks. The sub blocks are made of rubber and have a block height H2 lower than that the height H1 of the main blocks. A part of the rubber constituting a top portion of the sub block is removed to reduce the area of a upper face of the sub block.

15 Claims, 10 Drawing Sheets

(a)

(b) 
A-A (c) 
B-B (d) 
C-C (a)

(b)

A-A (c)

B-B (d)

C-C (a)

(b)

A-A (a)

(b)

(a)

(b)

A-A (c)

B-B (d)

C-C

MOTORCYCLE TIRE WITH TREAD HAVING MAIN BLOCKS AND LOWER HEIGHT SUB BLOCKS

TECHNICAL FIELD

The present invention relates to a motorcycle tire and especially to an off-road motorcycle tire such as a motocross tire suitably used on an off-road such as a dirt road.

BACKGROUND ART

A motorcycle tire used on an off-road such as a dirt road generally has a tread pattern provided with a plurality of blocks. Such a motorcycle tire is particularly desired to have a cornering characteristic on a dirt road at a higher level because the cornering characteristic as well as traction and breaking characteristics are considerably important among the various required characteristics. Especially, for a sport tire used in a motocross race or the like, a motorcycle turns at such a high rate of speed that a lateral gripping force of the tire becomes a critically important factor in determining how well the cornering characteristic is.

However, a conventional motorcycle tire retro fitted especially for dirt road conditions has a basic pattern in which a plurality of width direction block rows consist of a plurality of blocks located along the tire's width direction and the block rows are arranged along the tire's circumferential direction with a space therebetween from the viewpoint of getting better traction. Further, no block is generally placed between the width direction block rows to ensure a good mud expulsion characteristic. As a result, the tire has a poor resistance to a side force in a middle camber region which is most often used during the cornering on the dirt road. It is thus difficult to balance an anti-sideslip characteristic and a traction characteristic. As used herein, the middle camber region means a region between 10 and 40 degrees provided that a upstanding position of a motorcycle is 0 degrees and its horizontally banking position is 90 degrees.

That is, in the conventional motorcycle tire, if the block pitch in the width direction block rows 101 is increased to give a higher negative ratio for an improvement of the mud expulsion characteristic as shown in FIG. 7, the side force resistance is decreased, causing a poor anti-sideslip characteristic. Meanwhile, if a block which has the same height as that of the blocks constituting the width direction block row 101 is arranged between a width direction block row 101 and an adjacent width direction block row 101 for the purpose of enhancing the side force resistance and improving the anti-sideslip characteristic, such a problem occurs that deteriorates the mud expulsion characteristic. It is therefore extremely difficult for the conventional tire to satisfy both the traction and cornering characteristics without involving a deterioration of the mud expulsion characteristic.

Moreover, it is important for an off-road motorcycle radial tire, especially for the one used in motocross, to assure a rigid sidewall due to an attribute of its radial configuration. The tire rim will be hit and damaged primarily by a hard road surface if the rigidity of the sidewall is insufficient. Countermeasures such as simply increasing a case rigidity or increasing the inner pressure in use are effective ways to avoid the rim from being damaged. Such countermeasures, however, may cause a reduction in its capability to absorb bumps and gaps on the road surface, so that the block rigidity of the tread surface is necessarily lower than that of a bias tire, which decreases the gripping performance at the same time. Consequently, it has been extremely difficult for an off-road radial tire to improve its cornering characteristic as well as assure the rigid sidewall without reducing the capability to absorb bumps and the like on the road surface.

DISCLOSURE OF THE INVENTION

It is therefore an object of the present invention to provide a motorcycle tire capable of remarkably improving a traction characteristic and an anti-sideslip characteristic for cornering without deteriorating the mud expulsion characteristic especially on a dirt road. It is another object of the present invention to provide a motorcycle pneumatic radial tire which will improve a cornering characteristic as well as assure a rigid sidewall while maintaining a capability to absorb bumps on the surface of a dirt road.

To achieve the above-mentioned objects, a motorcycle tire according to the present invention has a plurality of main blocks scattered on a tread and is characterized in that sub blocks are provided between the main blocks, said sub block being made of rubber and having block height lower than that of the main block, and a part of the rubber constituting a top portion of the sub block has been removed to reduce the area of a upper face of the sub block.

In such a motorcycle tire, the sub blocks are preferably positioned between the main blocks adjacent with each other in the tire's width direction, between the main blocks adjacent with each other in the tire's circumferential direction, and/or between the main blocks adjacent with each other in the direction slanted in relation to the tire's circumferential direction.

Further, it is preferable that the negative ratio is between 65% and 97%; a tread curvature ratio obtained when a distance measured along the tire's radial direction between a tire sectional height position and a tread edge position is divided by the tread width is between 0.20 and 0.50; a block area ratio defined as the ratio of total area of upper faces of top portions of the sub blocks to a total area of upper faces of the main blocks is between 0.05 and 1.2 in each of plural basic pattern elements constituting the tread; and a block height ratio defined as a ratio of a block height of the sub blocks at its upper face to a block height of the main blocks is between 0.3 and 0.8. As used herein, the term "negative ratio" refers to the amount of the space of the grooves, calculated as a percentage of the tread area in each of the basic patter elements, on condition that the upper face area of the top portion of the sub block is included in the groove. Both of the negative ratio and the block area ratio are calculated from the upper face area of the main block, the upper face area of the top portion of the sub block, and the space of the groove all of which present in each of the basic patter elements of the developed tread.

Furthermore, it is preferable that the negative ratio is between 75% and 97%, the tread curvature ratio is between 0.20 and 0.50, and the block area ratio is between 0.2 and 1.2.

Alternatively, it is preferable that the negative ratio is between 65% and 85%, the tread curvature ratio is between 0.20 and 0.50, and the block area ratio is between 0.05 and 0.5.

It is also preferable that when a bending portion is provided at a mid point of a side wall extending from a groove bottom toward the upper face of the sub block and the sub block is divided into a bottom portion and a top portion, the upper face area of the top portion is between 0.2 and 0.8 times as much as the upper face area of the bottom portion.

The height of said bending portion from the groove bottom along the tire's radial direction is preferably at least 0.5 times and less than 1.0 times as much as the block height of the sub block.

The sub block preferably has such a shape that a dimension in the tire's circumferential direction is greater than a dimension in the tire's width direction.

The tire according to the present invention is preferably a radial tire.

BEST MODE FOR CARRYING OUT THE INVENTION

Figure 1:
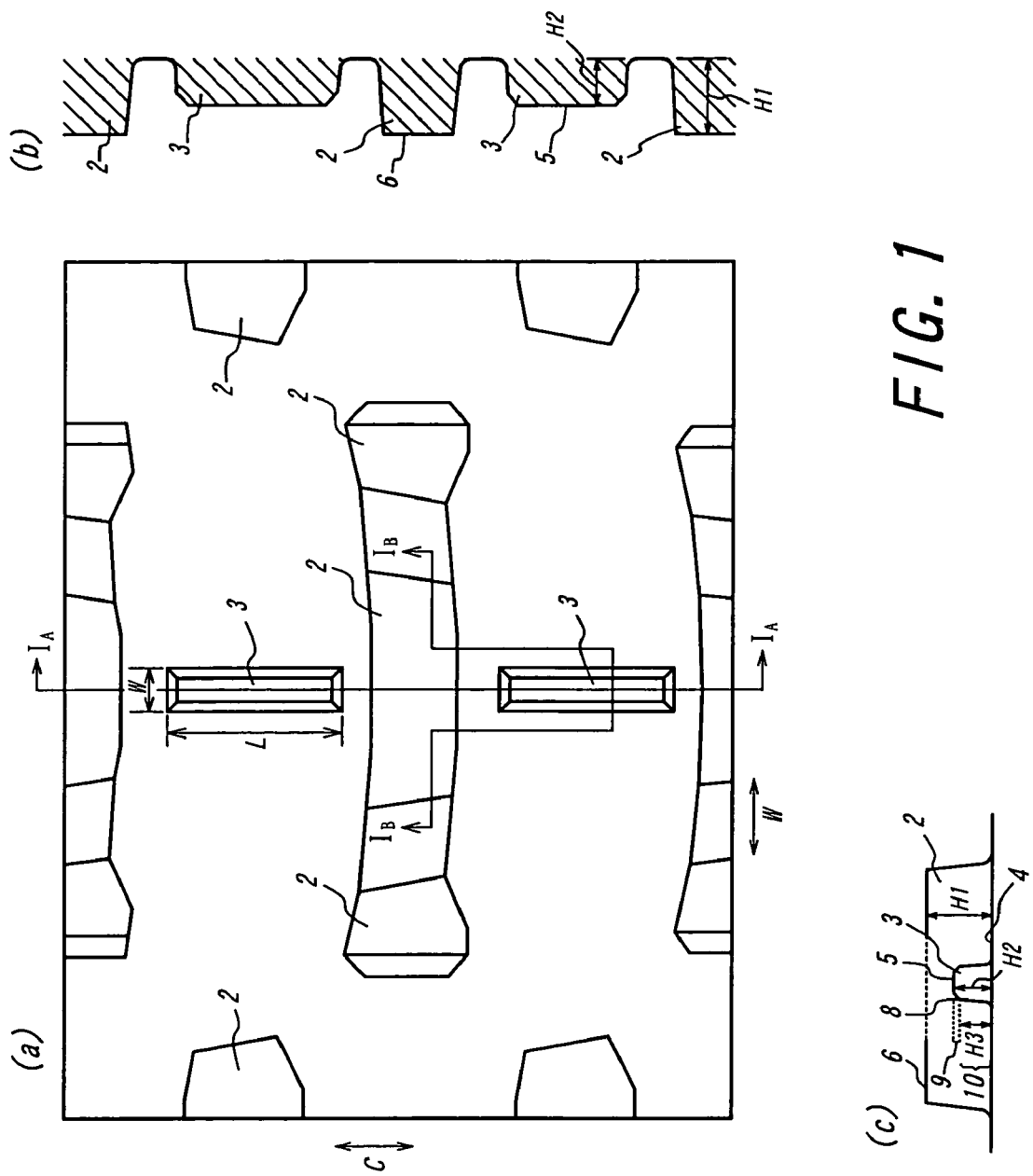
FIG. 1(a) is a partial development of a tread of one embodiment of a tire according to the present invention.
FIG. 1(b) is a sectional view taken along the line $I_A$-$I_A$ of FIG. 1(a)
FIG. 1(c) is a sectional view taken along the line $I_B$-$I_B$ of FIG. 1(a)

Hereinafter, illustrative embodiments of the present invention will be described with reference to the drawings. FIG. 1(a) is a partial development of a tread of a representative embodiment of a tire according to the present invention, FIG. 1(b) is a sectional view taken along the line $I_A$-$I_A$ of FIG. 1(a), and FIG. 1(c) is a sectional view taken along the line $I_B$-$I_B$ of FIG. 1(a).

The motorcycle tire (hereinafter referred to as "tire") shown in FIGS. 1(a)-(c) has a plurality of main blocks 2 scattered on a tread 1.

A constitutional feature of the present invention is intended to improve a traction characteristic and an anti-sideslip characteristic especially on a dirt road without involving a deterioration of a mud expulsion characteristic. More specifically, the constitutional feature is that sub blocks 3 are provided between the main blocks 2, said sub block 3 being made of rubber and having block height H2 lower than the height H1 of the main blocks 2, and a part of the rubber constituting a top portion 9 of the sub block 3 has been removed to reduce the area of a upper face 5 of the sub block 3.

In the next, it will be discussed, along with its operation, how the above-mentioned constitution has been adopted to the present invention.

The present inventor has examined a way of satisfactorily balancing the traction characteristic and the anti-sideslip characteristic especially on a dirt road without involving a deterioration of the mud expulsion characteristic. As a result, it is found that the sub block 3 which is provided between the main blocks 2 on the tread and which has the block height H2 lower than the height H1 of the main block 2 can produce a resistance force acting against a part of the mud stream flowing between the main blocks 2. It is also found that the sub block 3, however, does not completely block off the mud stream, so that both of the traction characteristic and the anti-sideslip characteristic can be improved without involving a serious deterioration of the mud expulsion characteristic.

The present inventor has also experimentally manufactured various types of tires having different shapes of the sub blocks 3, particularly shapes of the top portions 9 to examine a relation between the shape of the top portion and the above-mentioned characteristics. As a result, it is found that the sub block 3 having an appropriate shape of the top portion, i.e. the sub block 3 having a upper face 5 with its area being reduced by removing a part of the rubber constituting the top portion 9 of the sub block 3 can further enhance the traction characteristic and the anti-sideslip characteristic. In addition, it is found that such a sub block may possibly improve the mud expulsion characteristic. The present invention has been completed on the basis of these findings.

Figure 2:
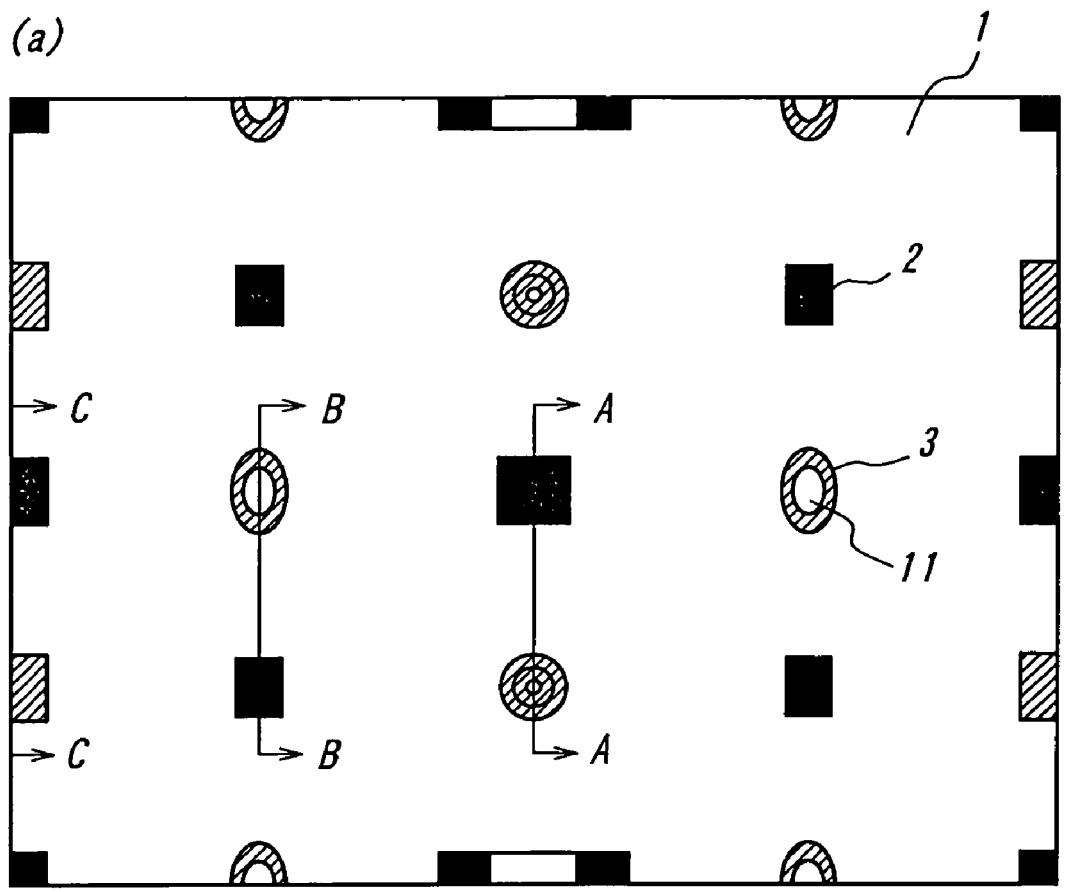
FIG. 2(a) is a partial development of a tread of another embodiment of a tire according to the present invention.
FIG. 2(b) is a sectional view taken along the line A-A of FIG. 2(a)
FIG. 2(c) is a sectional view taken along the line B-B of FIG. 2(a)
FIG. 2(d) is a sectional view taken along the line C-C of FIG. 2(a)
Figure 2:
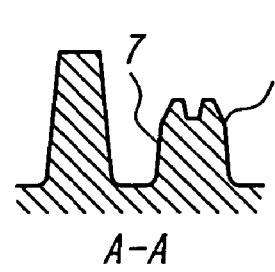
Figure 2:
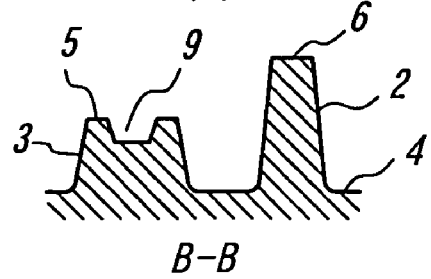
Figure 2:
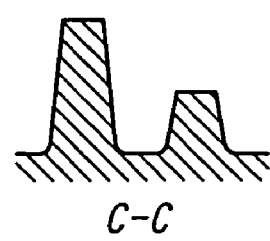

As means for reducing the area of the upper face 5 of the sub block 3, it is preferred to chamfer the edge of the sub block, as shown in FIGS. 1(a)-(c), or to form a depression 11 at the central region of the upper face 5, as shown in the B-B section of FIG. 2. With such means, a so-called spike effect which facilitates an intrusion of the top portion 9 of the sub block 3 into a dirt road is enhanced, resulting improvements in both of the traction characteristic and the anti-sideslip characteristic. In the case where the edge of the sub block is chamfered as shown in FIGS. 1(a)-(c), mud can easily pass over the sub blocks 3 so that the mud expulsion characteristic will be improved.

In order to emphasize particularly the traction characteristic and the straight-line stability, the sub block 3 is preferably positioned between the main blocks 2 and 2 adjacent with each other in the tire's width direction w. In order to emphasize particularly the anti-sideslip characteristic, the sub block 3 is preferably positioned between the main blocks 2, 2 adjacent with each other in the tire's circumferential direction c. If both of the traction characteristic and the anti-sideslip characteristic should be improved in a well-balanced manner, the sub block is preferably positioned between the main blocks 2 and 2 adjacent with each other in the direction slanted in relation to the tire's circumferential direction c. If necessary, the sub block 3 may be positioned in any two or more spaces existing between the above-mentioned three sets of the main blocks 2 and 2.

Further, the negative ratio is preferably between 65% and 97%. When the ratio is less than 65%, mud tends to clog in the tread to decrease the traction characteristic. When the ratio is more than 97%, the block rigidity of the main block 3 is difficult to be maintained.

The tread curvature ratio obtained when a distance measured along the tire's radial direction between a tire sectional height position and a tread edge position is divided by the tread width is preferably between 0.20 and 0.50. As a motorcycle turns with its body banking, which is so-called a camber running, the tread contact area in the corner will become too small and thus the steering stability will decrease when the tread curvature ratio is less than 0.20. To the contrary, the tread contact area during on the straight line will become too small and thus the straight-line stability will decrease when the tread curvature ratio is more than 0.50.

The block area ratio defined as the ratio of total area of upper faces 5 of the sub blocks 3 to a total area of upper faces 6 of the main blocks 2 is preferably between 0.05 and 1.2 in each of plural basic pattern elements constituting the tread. When the block area ratio is less than 0.05, the amount of the area of the sub blocks 3 is too small and thus the traction characteristic and the anti-sideslip characteristic cannot be sufficiently improved. When the block area ratio is more than 1.2, the distance between the sub blocks 3 is too narrow and thus the mud expulsion characteristic decreases to make mud clogged in the tread.

In addition, the block height ratio defined as a ratio of a block height $H_2$ of the sub blocks 3 at its upper face 4 to a block height $H_1$ of the main blocks 2 is preferably between 0.3 and 0.8. When the block height ratio is less than 0.3, the height of the sub block 3 is not enough to be able to sufficiently improve the traction characteristic and the anti-sideslip characteristic. When the block height ratio is more than 0.8, the mud expulsion characteristic decreases to make mud clogged in the tread.

If the tire of the present invention is attached particularly to a front wheel of a motorcycle, the negative ratio is preferably between 75% and 97%, and the block area ratio is preferably between 0.2 and 1.2. Since a motorcycle front tire needs an especially complicated steering operation, it is advantageous from the view point of improving steering stability that the negative ratio and the block area ratio are set to large, thereby improving the anti-sideslip characteristic.

If the tire of the present invention is attached to particularly to a rear wheel of a motorcycle, the negative ratio is preferably between 65% and 85%, and the block area ratio is preferably between 0.05 and 0.5. Since a motorcycle rear tire needs to effectively transmit the driving force from the engine to the road surface, it is advantageous that the negative ratio and the block area ratio are set to low to improve especially the traction characteristic and the anti-sideslip characteristic.

The ratio of the area of the upper face 5 of the top portion 9 to the area of the upper face of the bottom portion in the sub block 3 is preferably between 0.2 and 0.8. When the ratio is less than 0.2, the block rigidity of the top portion of the sub block 3 is insufficient. When the ratio is more than 0.8, a prompt mud expulsion cannot be exerted.

The ratio of height $H_3$ of the bending portion 8 along the tire's radial direction to the block height $H_2$ of the sub block 3 is preferably between 0.5 and 1.0. When the ratio is less than 0.5, the resistance force against the mud stream gets weaker and thus the traction characteristic and the anti-sideslip characteristic may unfavorably decrease. When the ratio is 1.0, the bending portion 8 agrees with the upper face 5, i.e. the sub block has no bending portion 8, which will not improve the mud expulsion characteristic at all.

The sub block 3 preferably has such a shape that a dimension L in the tire's circumferential direction is greater than a dimension W in the tire's width direction if the sub block 3 is arranged between the main blocks 2, 2 adjacent with each other in the tire's circumferential direction c as shown in FIG. 1(a). The sub block 3 has such a shape that the dimension in the tire's circumferential direction c is longer so that a large resistance force against the mud stream flowing in the tire's width direction can be exerted to improve the anti-sideslip characteristic. As well, the sub block 3 has such a shape that the dimension in the tire's width direction w is shorter so that the mud stream flowing in the tire's width direction can easily pass over the sub block 3 to assure the mud expulsion characteristic. The tire having such characteristics is suitably used for the rear tire for which a higher anti-sideslip characteristic is demanded.

When the tire of the present invention is adapted to a motorcycle pneumatic radial tire, a ply material having high modulus can be used and the side height can be reduced. As a result, the side wall rigidity can be assured and the cornering characteristic can be improved while its capability to absorb bumps, gaps and the like on the off-road surface is maintained.

Figure 3:
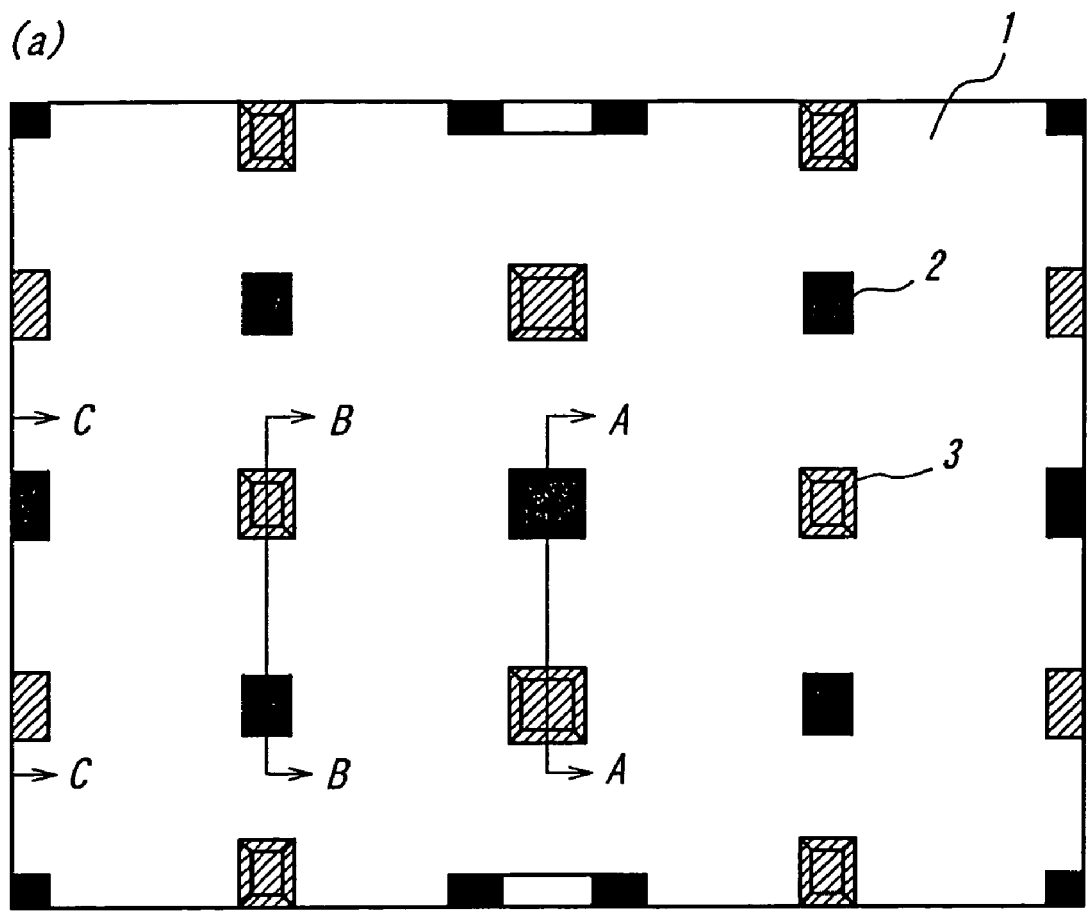
FIG. 3(a) is a partial development of a tread of another embodiment of a tire according to the present invention.
FIG. 3(b) is a sectional view taken along the line A-A of FIG. 3(a)
FIG. 3(c) is a sectional view taken along the line B-B of FIG. 3(a)
FIG. 3(d) is a sectional view taken along the line C-C of FIG. 3(a)
Figure 3:
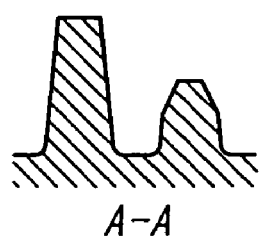
Figure 3:
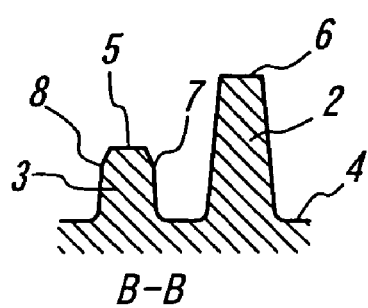
Figure 3:
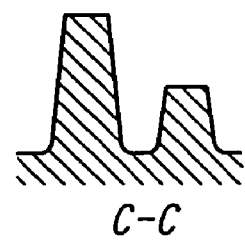
Figure 4:
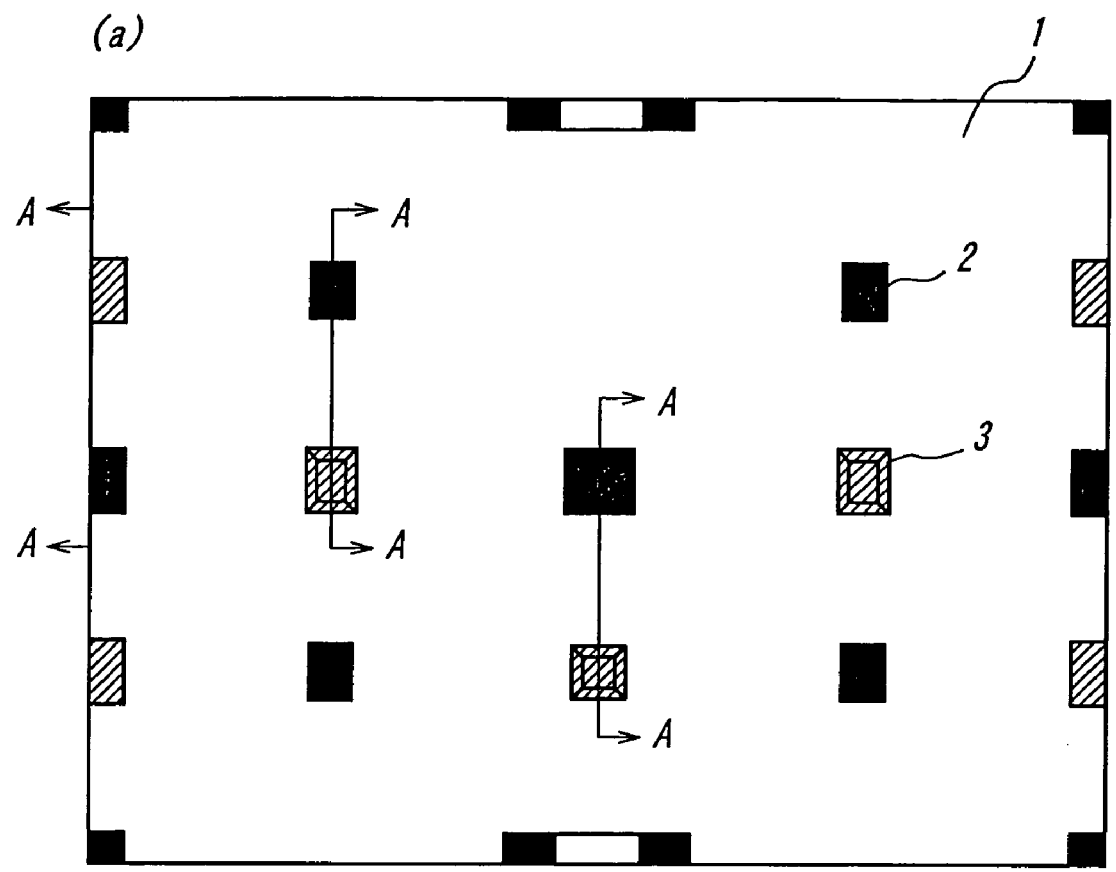
FIG. 4(a) is a partial development of a tread of another embodiment of a tire according to the present invention.
FIG. 4(b) is a sectional view taken along the line A-A of FIG. 4(a)
Figure 4:
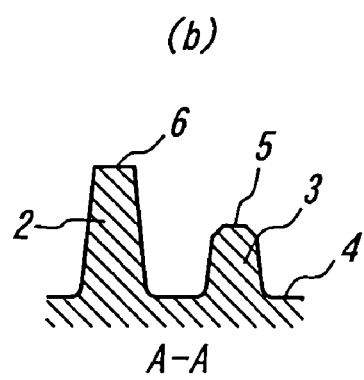
Figure 5:
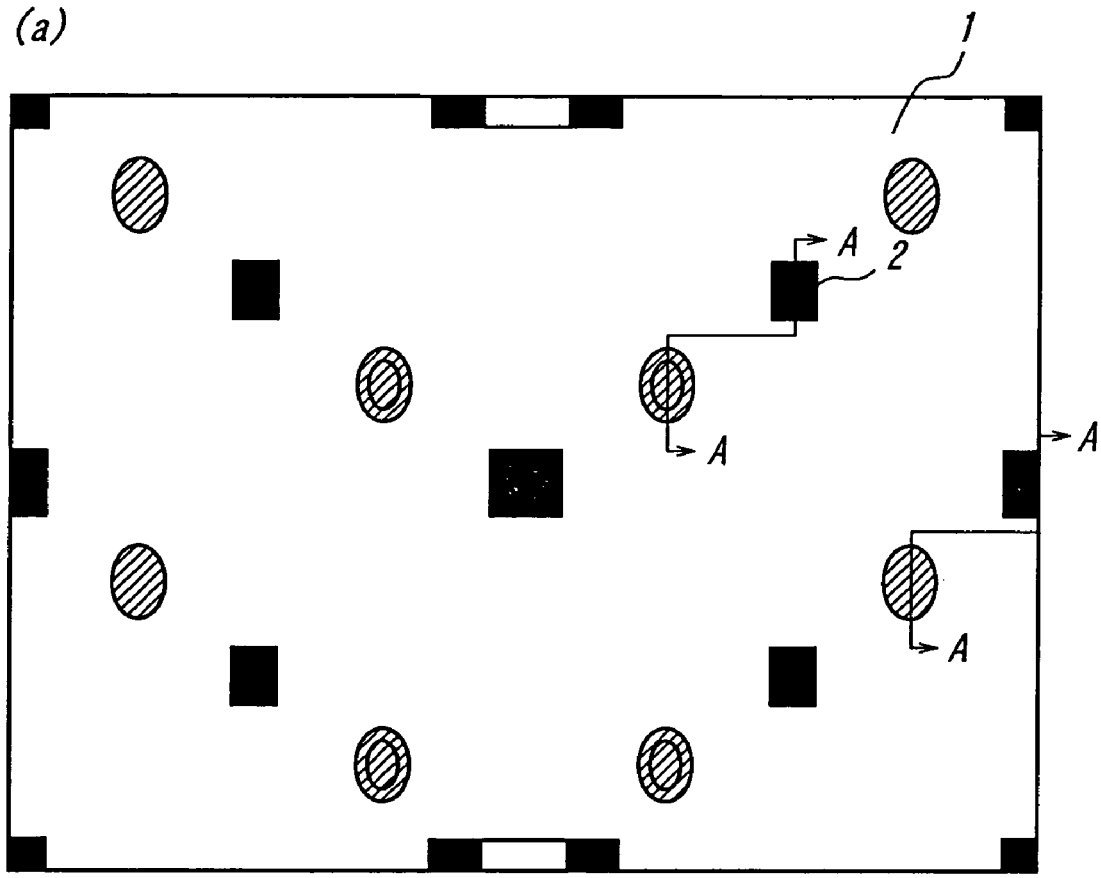
FIG. 5(a) is a partial development of a tread of another embodiment of a tire according to the present invention.
FIG. 5(b) is a sectional view taken along the line A-A of FIG. 5(a)
Figure 5:
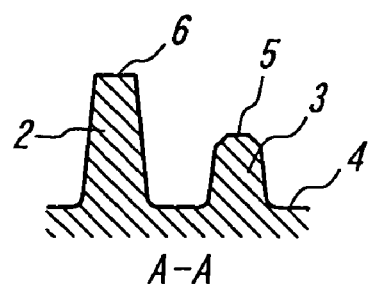

Although illustrative embodiments of the present invention have been described above, variations and modifications may be made without departing from the scope of the invention as defined by the appended claims. For example, as shown in FIG. 2, a depression 11 having a height lower than the surroundings is so formed on the upper face 5 of the sub block 3 that the upper face 5 of the sub block 3 has a doughnut-like plane shape. Further, the block height $H_2$ of the sub block 3 may differ with respect to each sub block. At least the upper face 5 of the sub block 3 located in the tread central region may be configured to decrease its area, as shown in FIGS. 2 and 3.

Figure 6:
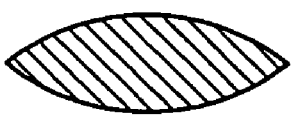
FIG. 6 shows plan views of sub blocks of various embodiments of tires according to the present invention.
Figure 6:
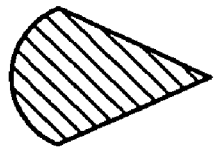
Figure 6:
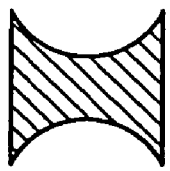
Figure 6:
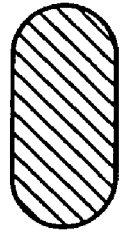
Figure 6:
Figure 6:
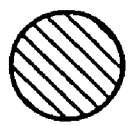
Figure 6:
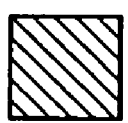
Figure 6:
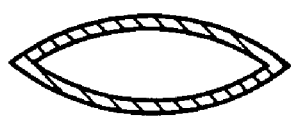
Figure 6:
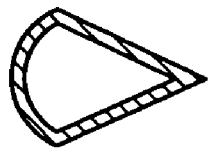
Figure 6:
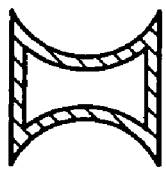
Figure 6:
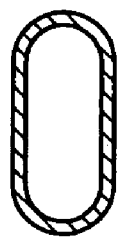
Figure 6:
Figure 6:
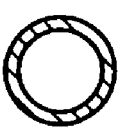
Figure 6:
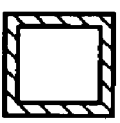
Figure 7:
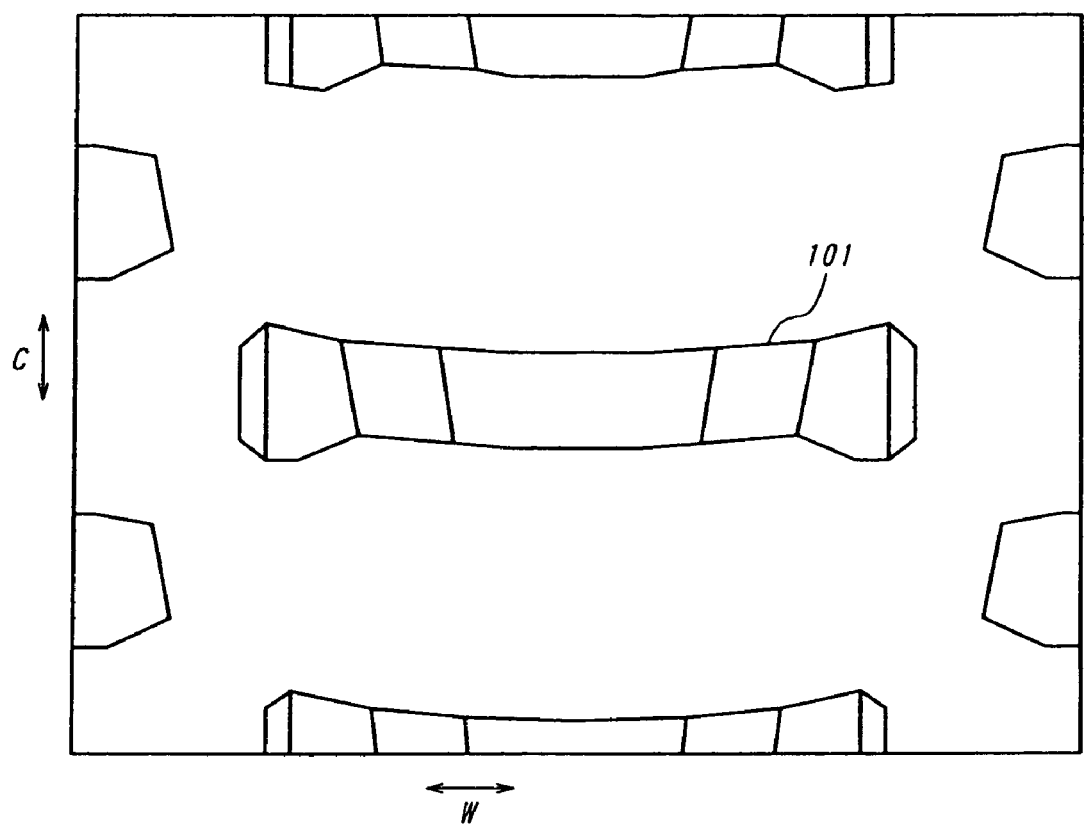
FIG. 7 is a partial development of a tread of a conventional rear tire.

Various kinds of shapes as shown in FIG. 6(a) including polygonal shapes such as a quadrangle, round shapes such as an ellipsoid and a perfect circle, shapes formed by a combination of lines and arcs, and shapes formed by arcs, as well as shapes having fabricated depressions on the above-mentioned shapes as shown in FIG. 6(b) may also be adopted to the planar shape of the sub block 3.

EXAMPLES

Three types of pneumatic tires according to the present invention were experimentally manufactured and their performances were evaluated. The details will be described below.

(1) Bias Tire for Rear Wheel

Figure 8:
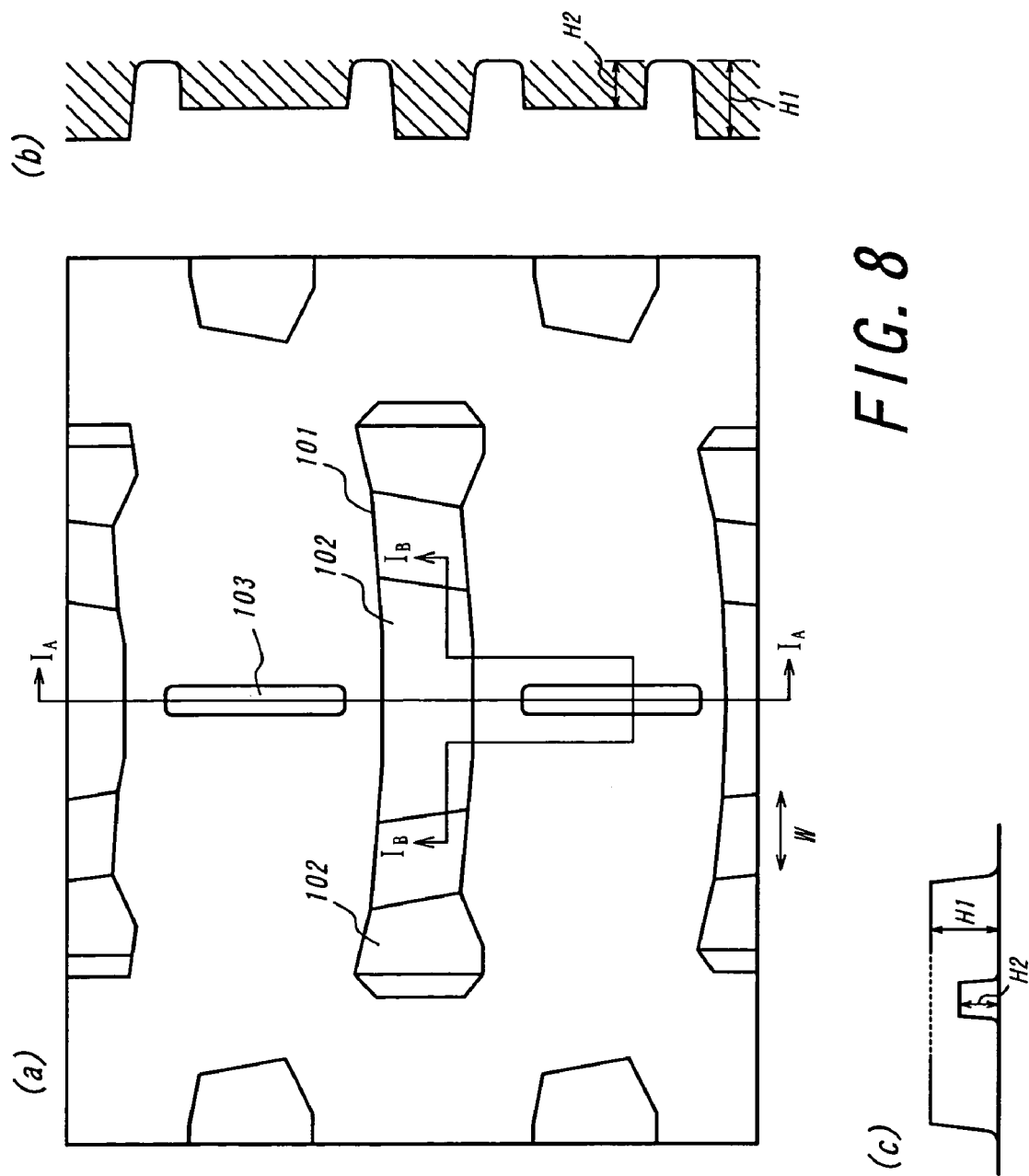
FIG. 8(a) is a partial development of a tread of the tire of Comparative Examples 1 and 2.
FIG. 8(b) is a sectional view taken along the line $I_A$-$I_A$ of FIG. 8(a)
FIG. 8(c) is a sectional view taken along the line $I_B$-$I_B$ of FIG. 8(a)

Example 1 was a motorcycle bias tire with a tread pattern shown in FIG. 1 and parameters shown in Table 1. For the purpose of a comparison, a motorcycle bias tire with a tread pattern shown in FIG. 8 and parameters shown in Table 1 (Comparative Example 1) was also prepared. Example 1 and Comparative Example 1 each had a carcass consisting of two bias plies formed by rubber-coating nylon cords extending at ±30 degrees in relation to the radial direction.

(2) Radial Tire for Rear Wheel

Example 2 was a motorcycle radial tire with a tread pattern shown in FIG. 1 and parameters shown in Table 2. For the purpose of a comparison, a motorcycle radial tire with a tread pattern shown in FIG. 8 and parameters shown in Table 2 (Comparative Example 2) was also prepared. Example 2 and Comparative Example 2 each had two belt layers made by rubber-coating aramid cords and a belt-reinforcing layer made by rubber-coating nylon cords.

(3) Tire for Front Wheel

Figure 9:
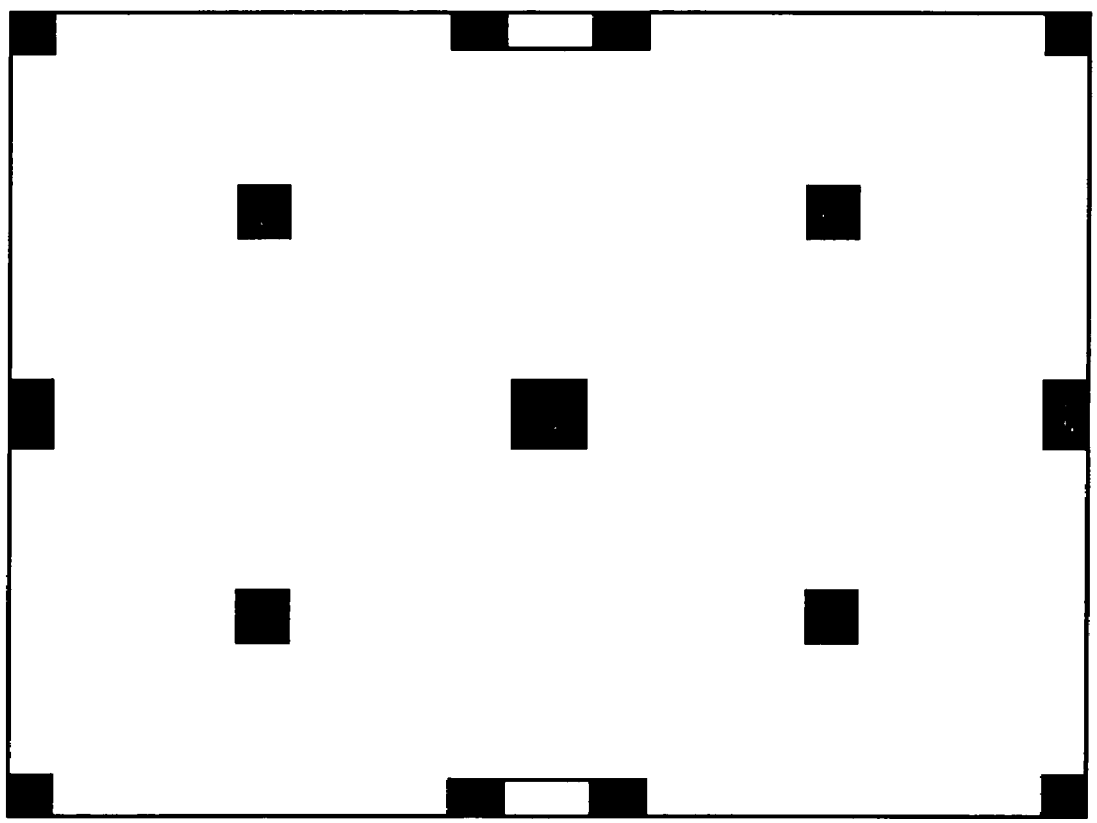
FIG. 9 is a partial development of a tread of the tire of Comparative Example 3.
Figure 10:
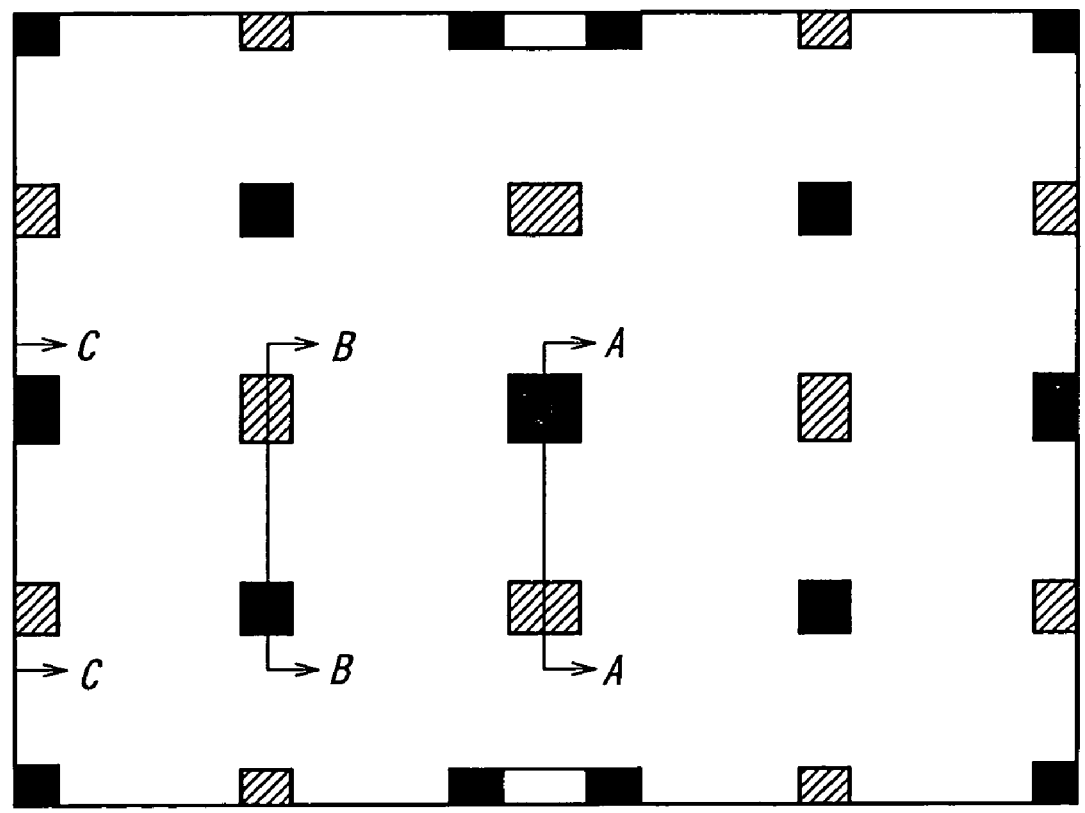
FIG. 10(a) is a partial development of a tread of the tire of Comparative Example 4.
FIG. 10(b) is a sectional view taken along the line A-A of FIG. 10(a)
FIG. 10(c) is a sectional view taken along the line B-B of FIG. 10(a)
FIG. 10(d) is a sectional view taken along the line C-C of FIG. 10(a).
Figure 10:
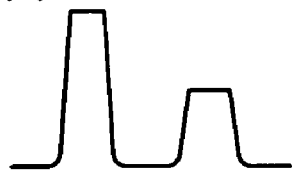
Figure 10:
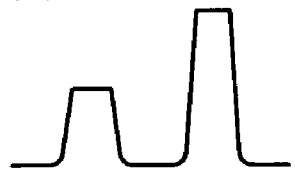
Figure 10:
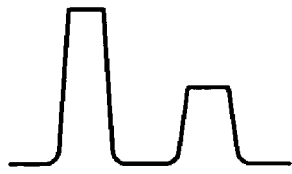

Examples 3-6 were motorcycle bias tires with tread pattern shown in FIGS. 2-5, respectively, and parameters shown in Table 3. For the purpose of comparison, motorcycle bias tires with tread patterns shown in FIGS. 9 and 10, respectively, and parameters shown in Table 3 (Comparative Examples 3 and 4) were also prepared. Examples 3-6 as well as Comparative Examples 3 and 4 had carcasses consisting of two bias plies formed by rubber-coating nylon cords extending at ±30 degrees in relation to the radial direction.

TABLE 1

(1) Bias tire for rear wheel (Tire size: MCS 110/90-19, Rim size: 2.15 × 19)

|  | Negative ratio | Tread curvature ratio | Block area ratio | Block height | H2/H1 | H3/H2 | Upper face area of top portion/upper face area of bottom portion |
|---|---|---|---|---|---|---|---|
| Example 1 | 81% | 0.33 | 0.05 | H1 = 17.5 mm<br>H2 = 5.3 mm<br>H3 = 4.2 mm | 0.3 | 0.8 | 0.7 |
| Comparative Example 1 | 81% | 0.33 | 0.06 | H1 = 17.5 mm<br>H2 = 5.3 mm | 0.3 | — | — |

TABLE 2

(2) Radial tire for rear wheel (Tire size: MCS 120/90R18, Rim size: 2.50 × 18)

|  | Negative ratio | Tread curvature ratio | Block area ratio | Block height | H2/H1 | H3/H2 | Upper face area of top portion/upper face area of bottom portion |
|---|---|---|---|---|---|---|---|
| Example 2 | 81% | 0.32 | 0.05 | H1 = 17.5 mm<br>H2 = 5.3 mm<br>H3 = 4.2 mm | 0.3 | 0.8 | 0.7 |
| Comparative Example 2 | 81% | 0.32 | 0.06 | H1 = 17.5 mm<br>H2 = 5.3 mm | 0.3 | — | — |

TABLE 3

(3) Bias tire for front wheel (Tire size: MCS 80/100-21, Rim size: 1.60 × 21)

|  | Negative ratio | Tread curvature ratio | Block area ratio | Block height | H2/H1 | H3/H2 | Upper face area of top portion/upper face area of bottom portion |
|---|---|---|---|---|---|---|---|
| Example 3 | 97% | 0.45 | 1 | H1 = 15 mm<br>H2 = 12 mm<br>H3 = 47 mm | 0.8 | 0.58 | 0.5 |
| Example 4 | 97% | 0.45 | 1.2 | H1 = 15 mm<br>H2 = 7.5 mm<br>H3 = 7 mm | 0.5 | 0.58 | 0.6 |
| Example 5 | 97% | 0.45 | 0.5 | H1 = 15 mm<br>H2 = 12 mm<br>H3 = 7 mm | 0.8 | 0.58 | 0.8 |

TABLE 3-continued (3) Bias tire for front wheel (Tire size: MCS 80/100-21, Rim size: 1.60 × 21)

|  | Negative ratio | Tread curvature ratio | Block area ratio | Block height | H2/H1 | H3/H2 | Upper face area of top portion/upper face area of bottom portion |
|---|---|---|---|---|---|---|---|
| Example 6 | 97% | 0.45 | 0.5 | H1 = 15 mm<br>H2 = 12 mm<br>H3 = 7 mm | 0.8 | 0.58 | 0.7 |
| Comparative Example 3 | 97% | 0.45 | — | H1 = 15 mm | — | — | — |
| Comparative Example 4 | 97% | 0.45 | 1.2 | H1 = 15 mm<br>H2 = 12 mm | 0.8 | — | — |

Test Procedure

The above-mentioned test tires were equipped on the rims as shown in Table 1-3 to form tire/wheel assemblies. Then, these tire/wheel assemblies were subjected to test ridings under the condition of the tire pressure of 80 kPa and the tire load corresponding to the state where one person is on board.

The tires of Examples 1 and 2, Comparative Examples 1 and 2 were mounted on the rear wheels. In this regard, the tire of Comparative Example 3 was mounted on the front wheel.

The tires of Examples 3-6, Comparative Examples 3 and 4 were mounted on the front wheels. In this regard, the tire of Comparative Example 1 was mounted on the rear wheel.

A professional rider rode motorcycles equipped with the test tires on an off-road and sensory evaluated the traction characteristic, anti-sideslip characteristic and mud expulsion characteristic. Further, the rigidity and the capability to absorb bumps and gaps were also evaluated.

The test results were shown in Tables 4-6, wherein each performance was represented by an index on a scale on which 10 is full marks. The larger the index value, the better the performance.

TABLE 4

|  | Traction char. | Anti-sideslip char. | Mud expulsion char. |
|---|---|---|---|
| Example 1 | 6 | 7 | 6 |
| Comparative Example 1 | 5 | 5 | 5 |

TABLE 5

|  | Traction char | Anti-sideslip char | Mud expulsion char | Rigidity | Capability to absorb bumps and gaps |
|---|---|---|---|---|---|
| Example 2 | 5 | 7 | 5 | 6 | 6 |
| Comparative Example 2 | 5 | 5 | 5 | 5 | 5 |

TABLE 6

|  | Traction char. | Anti-sideslip char. | Mud expulsion char. |
|---|---|---|---|
| Example 3 | 8 | 8 | 4.5 |
| Example 4 | 8 | 8 | 5 |
| Example 5 | 6 | 7 | 5 |

TABLE 6-continued

|  | Traction char. | Anti-sideslip char. | Mud expulsion char. |
|---|---|---|---|
| Example 6 | 7 | 7 | 5 |
| Comparative Example 3 | 5 | 5 | 5 |
| Comparative Example 4 | 6 | 6 | 4 |

As seen from the results of Tables 4-6, it is clear that each tire of Examples has a superior overall performance in terms of the mud expulsion characteristic, traction characteristic and anti-sideslip characteristic as compared with the tires of Comparative Examples. Moreover, the rigidity and the capability to absorb bumps and gaps of the radial tire for a rear wheel are improved as compared with the tires of Comparative Examples.

INDUSTRIAL APPLICABILITY

According to the present invention, it is possible to provide a motorcycle tire capable of remarkably improving a traction characteristic and an anti-sideslip characteristic for cornering without deteriorating the mud expulsion characteristic on a dirt road. It is also possible to provide a motorcycle pneumatic radial tire, especially the one used in motocross, which will improve a cornering characteristic as well as assure a rigid sidewall while maintaining a capability to absorb bumps and gaps on the surface of an off-road.

The invention claimed is:

1. A motorcycle tire, comprising:
a plurality of main blocks scattered on a tread; and
sub blocks provided on a centerline of the tire between the main blocks in a tire circumferential direction, each sub block being made of rubber and having a block height lower than that of the main blocks, each sub block comprising:
a top portion extending downward from an upper face of the sub block to a bending portion of a sidewall of the sub block; and
a bottom portion extending downward from the bending portion to a groove surface,
wherein an area of the upper face of the sub block is less than a cross sectional area of the sub block at a height of the bottom portion, and
the bending portion extends around a perimeter of the sub block.

2. A motorcycle tire, comprising:

a plurality of main blocks scattered on a tread; and sub blocks provided on a centerline of the tire between the main blocks in a tire circumferential direction, each sub block being made of rubber and having a block height lower than that of the main blocks, each sub block comprising a bending portion that extends around a perimeter of the sub block at a mid point of a side wall extending from a groove bottom toward an upper face of the sub block, wherein, an upper face area of the sub block is smaller than a cross sectional area of the sub block at a height of the bending portion.

3. A motorcycle tire, comprising:

a plurality of main blocks scattered on a tread; and sub blocks provided on a centerline of the tire between the main blocks in a tire circumferential direction, each sub block being made of rubber and having a block height lower than that of the main blocks, each sub block comprising:

- a bottom portion extending radially upward from the tread and having a side that maintains substantially a constant angle with respect to the radial direction; and
- a top portion extending radially upward from the bottom portion to an upper face of the sub block, wherein a cross sectional area of the upper face of the sub block is less than a cross sectional area of the sub block at a radially uppermost portion of the bottom portion based on at least a change in the angle of the side of the sub block radially upward from the bottom portion, the change in the angle of the side of the sub block extends around a perimeter of the sub block.

4. The motorcycle tire according to claim 1, further comprising sub blocks positioned between the main blocks adjacent with each other in a tire width direction.

5. The motorcycle tire according to claim 1, further comprising sub blocks positioned between the main blocks adjacent with each other in a tire circumferential direction.

6. The motorcycle tire according to claim 1, further comprising sub blocks positioned between the main blocks adjacent with each other in a direction slanted in relation to a tire circumferential direction.

7. The motorcycle tire according to claim 1, wherein a negative ratio is between 65% and 97%, the negative ratio being an amount of space of a groove, calculated as a percentage of a tread area in each of plural basic pattern elements constituting the tread on condition that the upper face area of the top portion of the sub block is included in the groove;

a tread curvature ratio, obtained when a distance measured along the a tire radial direction between a tire sectional height position and a tread edge position is divided by the tread width, is between 0.20 and 0.50;

a block area ratio, defined as the ratio of total area of upper faces of top portions of the sub blocks to a total area of upper faces of the main blocks, is between 0.05 and 1.2 in each of plural basic pattern elements constituting the tread; and a block height ratio, defined as a ratio of a block height of the sub blocks at an upper face to a block height of the main blocks, is between 0.3 and 0.8.

8. The motorcycle tire according to claim 7, wherein said negative ratio is between 75% and 97%, said tread curvature ratio is between 0.20 and 0.50, and said block area ratio is between 0.2 and 1.2.

9. The motorcycle tire according to claim 7, wherein said negative ratio is between 65% and 85%, said tread curvature ratio is between 0.20 and 0.50, and said block area ratio is between 0.05 and 0.5.

10. The motorcycle tire according to claim 1, wherein the upper face area of the top portion is between 0.2 and 0.8 times as much as the upper face area of the bottom portion.

11. The motorcycle tire according to claim 1, wherein a bending portion is provided at a mid point of a side wall extending from a groove bottom toward an upper face of the sub block, and the height of said bending portion from the groove bottom along a tire radial direction is at least 0.5 times and less than 1.0 times as much as the block height of the sub block.

12. The motorcycle tire according to claim 1, wherein said sub block has such a shape that a dimension in a tire circumferential direction is greater than a dimension in a tire width direction.

13. The motorcycle tire according to claim 1, wherein said tire has a radial carcass.

14. The motorcycle tire according to claim 1, wherein each of the sub blocks is provided between a width of a respective main block adjacent to the sub block in a tire circumferential direction.

15. The motorcycle tire according to claim 1, wherein the cross sectional area of the upper face of the sub block is less than a cross sectional area of the sub block at a radial uppermost portion of the bottom portion further based on at least a depression in the upper face of the sub block.

* * * * *